United States Patent Office 2,859,220
Patented Nov. 4, 1958

2,859,220

ENDO-BRIDGE DILACTONES AND PREPARATION THEREOF

John C. Sauer, Wilmington, Del., assignor to E. I. du Pont de Nemours and Company, Wilmington, Del., a corporation of Delaware No Drawing. Application September 4, 1956
Serial No. 607,603

16 Claims. (Cl. 260—343.3)

This invention relates to new compositions of matter and to a method for their preparation. More particularly this invention relates to new endobridge dilactones and to methods for their preparation.

When acetylenes are reacted with carbon monoxide in the presence of a catalytic amount of a cobalt carbonyl, as described in my copending patent application Ser. No. 549,155, filed November 25, 1955, as a continuation-in-part of Ser. No. 432,599, filed May 26, 1954, now abandoned, there are obtained new dilactones corresponding to $C_8(RR')_2O_4$, wherein R and R' are hydrogen, haloaryl, alkoxyaryl, or hydrocarbon radicals free from non-aromatic unsaturation, and which show strong lines in the ultraviolet spectra in the region of 3300–4400 A., and yield suberic acids on hydrogenation over platinum in acetic acid. When acetylene is reacted with carbon monoxide in the presence of a catalytic amount of cobalt carbonyl, as described in my aforesaid patent application there is obtained $[\Delta^{2,2'(5H,5'H)}$-bifuran]-5,5'-dione.

It is an object of this invention to provide new compositions of matter and a method for their preparation. A further object is to provide new dilactones having one to two endo-bridges and a process for their preparation. A still further object is to provide new endo-ring dilactones which can be reacted with diamines, such as hexamethylenediamine, to form polyamides. Other objects will appear hereinafter.

These and other objects of this invention are accomplished by providing new endo-bridge dilactones consisting of the adduct of from 1 to 2 moles of a conjugated diene with a dilactone having the formula $C_8(RR')_2O_4$ wherein R and R' are hydrogen, haloaryl, alkoxyaryl or monovalent hydrocarbon radicals free from non-aromatic unsaturation. In the new endo-bridge dilactones of this invention the conjugated diene has been added by 1,4-addition to the double bonded carbon atoms of one or both of the lactone rings forming respectively the 1:1 and 1:2 adducts. It has been found that the dilactone functions as a dienophile with conjugated dienes forming new bridge-ring dilactones. This invention particularly provides the monoadduct and diadduct of conjugated dienes with the dilactone $[\Delta^{2,2'(5H,5'H)}$-bifuran]-5,5'-dione.

The new endo-bridge dilactones of this invention are made by charging the dilactone into a reactor containing a reaction medium, if desired. To the charge there is then added from 1 to 2 moles of conjugated diene per mole of dilactone and the charge is then heated to between 75° and 225° C. The reaction mixture is maintained within the indicated range for at least one hour. It is thereafter allowed to cool and the contents discharged. The desired product is recovered by filtration or by evaporation of the reaction medium. The product can be purified by recrystallization.

The examples which follow are submitted to illustrate and not to limit this invention.

Example I

The trans dilactone $[\Delta^{2,2'(5H,5'H)}$-bifuran]-5,5'-dione, prepared as described subsequently (8.4 g.) and 13.8 g. of alpha-phellandrene (2-methyl-5-isopropyl-1,3-cyclohexadiene) were heated to reflux temperature (175° C.). A vigorous reaction ensued which made further external heating unnecessary. After cooling and several days standing, crystals of the 1:1 adduct separated, which melted at 168–175° C., after washing with petroleum ether.

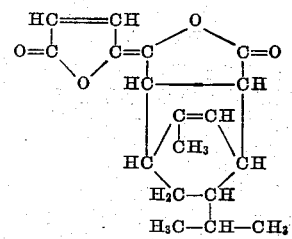

1:1 adduct of 2-methyl-5-isopropyl-1,3-cyclohexadiene with the trans dilactone $[\Delta^{2,2'(5H,5'H)}$-bifuran]-5,5'-dione Analysis.—Calc'd for $C_{18}H_{20}O_4$: C, 71.9%; H, 6.7%; M. W., 300. Found: C, 71.8%; H, 6.9%; M. W., 305, 310.

The adduct was soluble in acetone, xylene, or chloroform; sparingly soluble in methanol; and insoluble in petroleum ether.

Example II

The trans dilactone of Example I (10 g., 0.06 mole), butadiene (20 g., 3.7 moles), dioxane (200 ml.), and an inhibitor (p-nitroso-N,N-diethylaniline, 0.14 g.) were heated at 100° C. in a closed steel vessel for 16 hours, after which 4.1 g. of undissolved dilactone remained. The solution was freed of its solvent under reduced pressure, leaving 5.9 g. (75%) of a solid, soluble in chloroform, M. P. 106–110° C. Recrystallization from ethyl acetate-petroleum ether gave white, waxy needles, M. P. 109.5° C. of the 1:1 adduct.

Analysis.—Calc'd for $C_{12}H_{10}O_4$: C, 66.05%; H, 4.62%; M. W., 218. Found: C, 65.95%, 66.15%; H, 4.66%, 4.77%; M. W., 227, 228.

Infrared analysis: 3.2μ (=CH), 3.4μ (saturated CH), 5.5μ and 5.6μ (carbonyls of two lactone rings), 5.9μ (exocyclic double bond), 6.5μ (conjugated unsaturation).

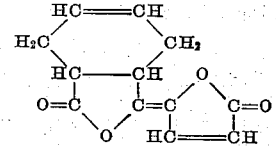

1:1 adduct of 1,3-butadiene with the trans dilactone $[\Delta^{2,2'(5H,5'H)}$-bifuran]-5,5'-dione The splitting of the carbonyl band in the infared into two peaks demonstrates that one of the double bonds adjacent to the carbonyl group acted as the dienophile, since if the central double bond has reacted, the two lactone rings would have remained identical.

Example III

The trans dilactone of Example I (25 g., 0.15 mole), 2,3-dimethyl-1,3-butadiene (13 g., 0.16 mole, containing hydroquinone), and dioxane (200 ml.), were heated at 150° C. for 16 hours in a closed steel vessel. The product was filtered to give 10.4 g. of a pale yellow solid, M. P. 151–154° C. Concentration of the filtrate gave an additional 20.9 g. of the 1:1 adduct bringing the total yield to 31.3 g. (84%). The second crop was recrystallized from ethyl acetate-petroleum ether, M. P. 153–154° C.

*Analysis.*—Calc'd for $C_{14}H_{14}O_4$: C, 68.28%; H, 5.73%. Found: C, 68.71%; H, 5.56%.

Infrared analysis is similar to that of Example II; 3,4μ (saturated CH), 5.55μ and 5.65μ (carbonyls of two lactone rings), 5.87μ (exocyclic double bond), 6.48μ (double bond in lactone ring).

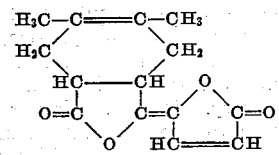

1:1 adduct of 2,3-dimethyl-1,3-butadiene with the trans dilactone [Δ$^{2,2'(5H,5'H)}$-bifuran]-5,5'-dione

Example IV

The cis form of the dilactone of Example I (24.2 g., 0.15 mole), 2,3-dimethyl-1,3-butadiene (13 g., 0.16 mole, containing hydroquinone), and dioxane (200 ml.) were heated in a steel tube for 16 hours at 150° C. The product was filtered to give 8.6 g. (24%) of a white solid corresponding in structure to a 1:1 adduct below. Infrared analysis showed carbonyls at 5.50 and 5.65μ, 5.88μ (exocyclic double bond), 6.48μ (double bond in lactone ring), 3.4μ (saturated CH). The product was thus similar to that of the product of Examples II and III.

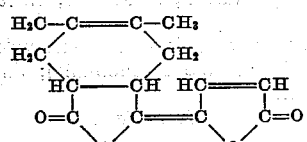

1:1 adduct of 2,3-dimethly-1,3-butadiene with the cis dilactone [Δ$^{2,2'(5H,5'H)}$-bifuran]-5,5'-dione The above product was much less soluble than the corresponding adduct of Example III from the trans dilactone and was recrystallized from ethyl acetate, M. P. 174–178° C. This product analyzed:

*Analysis.*—Calc'd for $C_{14}H_{14}O_4$: C, 68.28%, H, 5.73%. Found: C, 67.95%; H, 5.71%.

The filtrate from the reaction mixture was concentrated by distillation under reduced pressure to give 19.1 g. (53%) of a pale yellow solid, which melted at 156° C., after recrystallization from ethyl acetate. This compound did not depress the melting point of the adduct of Example III and must therefore be the adduct from the trans dilactone. It is assumed that this arose from thermal isomerization of the adduct from the cis dilactone.

Example V

A solution of 15.1 g. (0.061 mole) of the monoadduct of Example III from the trans dilactone and 5.3 g. (0.065 mole) of 2,3-dimethyl-1,3-butadiene in 200 ml. of dioxane was heated at 150° C. for 19 hours in a closed steel vessel. Filtration of the product separated 1.7 g. (23% at 50% conversion) of the diadduct from the solution which on concentration gave 7.6 g. of recovered starting material. The diadduct was recrystallized from methyl ethyl ketone and melted at 244° C.

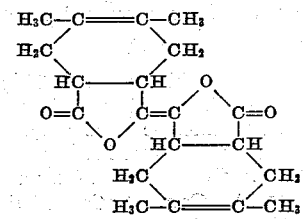

Diadduct of 2,3-dimethyl-1,3-butadiene with the trans dilactone [Δ$^{2,2'(5H,5'H)}$-bifuran]-5,5'-dione

*Analysis.*—Calc'd for $C_{20}H_{24}O_4$: C, 73.14%; H, 737%; N.W., 328. Found: C, 72.67%, 72.15%; H, 7.26%, 7.00%; N. W., 314.

The completely symmetrical compound exhibits the expected infrared spectrum. There is no absorption band for the central double bond and the lactone carbonyl gives a sharp absorption peak at 5.62μ.

Example VI

The trans dilactone of Example I (20 g., 0.12 mole), 2,3 - dimethyl - 1,3 - butadiene (22 g., 0.27 mole), and dioxane (200 ml.) were heated at 175° C. for 18 hours in a closed vessel. The sparingly soluble diadduct from the trans dilactone (9.2 g., 23%) separated from the solution and melted at 240–243° C. From the filtrate was obtained 20.1 g. (67%) of the monoadduct of Example III, M. P. 154–156° C. after recrystallization from ethyl acetate.

Example VII

The trans dilactone of Example I (16.4 g., 0.10 mole), 1,3-butadiene (25 g., 0.64 mole), and dioxane (200 ml.) were heated at 200° C. for 17 hours. The diadduct of 1,3-butadiene from the trans dilactone (1.4 g.) separated from the solution. Another 2.3 g. was obtained from the mother liquor bringing the yield to 14%. The new dilactone could be recrystallized from either methyl ethyl ketone or ethyl acetate and melted at 232° C.

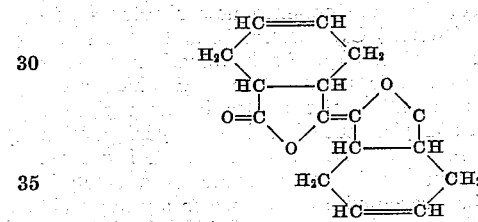

Diadduct of 1,3-butadiene with the trans dilactone [Δ$^{2,2'(5H,5'H)}$-bifuran]-5,5'-dione

*Analysis.*—Calc'd for $C_{16}H_{16}O_4$: C, 70.57%; H, 5.92%. Found: C, 70.44%; H, 5.84%.

Example VIII

The monoadduct of Example IV from the cis dilactone (7.4 g., 0.045 mole), M. P. 174–178° C. was heated at 150° C. with 2,3-dimethyl-1,3-butadiene (3.7 g., 0.045 mole) in dioxane (200 ml.) for 19 hours. The resulting solution was evaporated to dryness and the residue triturated with chloroform and petroleum ether to give 0.8 g. (11%) of a white solid, which after recrystallization from ethyl acetate melted at 208–209° C.

*Analysis.*—Calc'd for $C_{14}H_{14}O_4$: C, 68.28%; H, 5.73%; M. W., 246. Found: C, 68.28%, 68.51%; H, 5.88%, 5.93%; M. W., 264, 260.

*Infrared analysis.*—3.45μ (saturated CH), 5.5μ and 5.7μ (carbonyls of two lactone rings), 5.85μ (exocyclic double bond), 6.1μ (>C=C<).

From the mother liquor, there were recovered 2.9 g. (39%) of the starting material.

The new adduct is probably related to the monoadduct from the cis dilactone by cis-trans isomerism at the points of junction of the fused rings (i. e., of the decahydronaphthalene type).

In the examples, butadiene, 2,3-dimethylbutadiene, and alpha-phellandrene have been used as the conjugated diene. It is to be understood that in place of these conjugated diene hydrocarbons, other conjugated dienes can be employed. Examples are conjugated diolefinic chlorides, such as 2-chloro-1,3-butadiene, lower alkyl conjugated diolefinic and triolefinic esters, such as methyl 2,4-hexadienoate, 4 - ethyl - 1,3 - hexadienoate and 2,4,6-heptatrienoate, and aliphatic and cycloaliphatic conjugated diolefins and triolefins such as alpha-terpinene, cyclopentadiene, hexachlorocyclopentadiene, 1,3,5-hexatriene, and the like. The conjugated dienes are preferably of 4 to 10 carbon atoms and of from 2 to 3 conjugated carbon-to-carbon double bonds.

The [Δ²,²'(5H,5'H)-bifuran]-5,5'-dione, used in the examples, was prepared by charging into a steel pressure reactor of 400 cc. capacity 26 g. of acetylene, 200 ml. of acetone, and 1.5 g. of dicobalt octacarbonyl. The mixture was heated with carbon monoxide at a pressure of 1000 atmospheres for 14–17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid.

The [Δ²,²'(5H,5'H)-bifuran]-5,5'-dione exists in the form of two structural isomers, which yield suberic acid when hydrogenated with platinum in acetic acid. The normal or low melting form, 230–237° C. is the trans form and the high melting form, 240–248° C. is the cis form. The formulae of these structural isomers of [Δ²,²'(5H,5'H)-bifuran]-5,5'-dione are as follows:

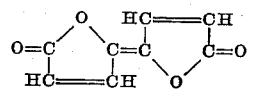

Low melting or trans form

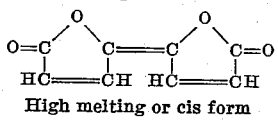

High melting or cis form

The dilactones used in preparing the compounds of this invention are the products obtained by reacting an acetylene with carbon monoxide in the presence of a cobalt carbonyl catalyst, as disclosed and claimed in my copending application, U. S. Ser. No. 549,155, filed November 25, 1955.

The cobalt carbonyl catalyst may be made directly by reaction of carbon monoxide with the metal in active form, as described in the J. Am. Chem. Soc. 70, 383–6 (1948).

The acetylenes used in preparing these dilactones correspond to R—C≡C—R', in which R and R' are hydrogen, alkoxyaryl, especially where the alkoxy group is of not more than 12 carbon atoms and the aryl radical is hydrocarbon of not more than 10 carbon atoms, haloaryl especially chloroaryl where the aryl radical is hydrocarbon of not more than 10 carbon atoms, or monovalent hydrocarbon radicals free from non-aromatic unsaturated, especially of not more than 12 carbon atoms, e. g., alkyl, especially short chain alkyl, i. e., containing not more than seven carbon atoms, aryl, especially where the aryl radical is hydrocarbon of not more than 10 carbon atoms, aralkyl, especially of not more than seven carbon atoms, or cycloalkyl, particularly of not more than seven carbon atoms. Examples of such radicals are methyl, ethyl, octyl, decyl, dodecyl, phenyl, tolyl, xylyl, naphthyl, benzyl, cyclohexyl, methylcyclohexyl, chlorophenyl, methoxyphenyl, ethoxyphenyl, decylphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

By employing such substituted acetylenes, there are obtained dilactones corresponding in molecular formula to $C_8(RR')_2O_4$, the radicals R and R' corresponding to the substituents attached to the triply bonded carbon in the acetylene reactant, i. e., R and R' in R—C≡C—R'. Thus, as shown by the aforementioned Sauer application, there are prepared the following dilactones:

[Δ²,²'(5H,5'H)-biphenylfuran]-5,5'-dione
[Δ²,²'(5H,5'H)-bidiethylfuran]-5,5'-dione
[Δ²,²'(5H,5'H)-bi-n-butylfuran]-5,5'-dione
[Δ²,²'(5H,5'H)-bi-β-naphthylfuran]-5,5'-dione
[Δ²,²'(5H,5'H)-bichlorophenylfuran]-5,5'-dione
[Δ²,²'(5H,5'H)-bi-o-methoxyphenylfuran]-5,5'-dione, and the like.

The reaction between the acetylene and carbon monoxide is carried out batchwise or continuously in the presence of an inert organic liquid medium. By "inert organic liquid medium" is meant organic liquids which contain no active hydrogen, as defined by S. Siggia in his "Quantitative Organic Analysis Via Functional Groups," 2nd ed. (1954), page 78, chapter 7, and as determined by the Zerewitinoff method, Ber. 40, 2026 (1907); J. Am. Chem. Soc. 49, 3181 (1927). Specific organic reaction media are isooctane, toluene, acetonitrile, acetone, ethylacetate, dioxane, cyclohexanone, xylene, benzene, etc.

The unsaturated dilactones can be represented by the general formula

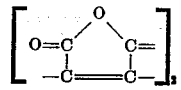

where one of the ring doubly bonded carbon atoms has its free valence satisfied by R and the other of the ring doubly bonded carbon atoms has its free valence satisfied by R', with R and R' being defined as aforesaid with respect to the acetylenic reactants.

Substitution of the hereinbefore listed dilactones for the [Δ²,²'(5H,5'H)-bifuran]-5,5'-dione of the examples in the process of the examples leads to the obtainment of the corresponding endo-bridge dilactones. In this manner mono- and diadducts of alpha-phellandrene, 1,3-butadiene, 2,3-dimethylbutadiene and other conjugated dienes are obtained with the hereinbefore listed dilactones. Thus, the mono- and diadducts of alpha-phellandrene, 1,3-butadiene and 2,3-dimethylbutadiene with [Δ²,²'(5H,5'H)-bidiethylfuran]-5,5'-dione, [Δ²,²'(5H,5'H)-bichlorophenylfuran]-5,5'-dione, [Δ²,²'(5H,5'H)-bi-o-methoxyphenylfuran]-5,5'-dione, and with the other dilactones are obtained.

Although not essential, an organic liquid reaction medium is generally used in effecting the condensation between the dilactone $C_8(RR')_2O_4$ and the diene. Examples of such media are benzene, toluene, dioxane, ethyl acetate, and the like. The amount of reaction medium is not critical and it can vary from an amount equal in weight to the combined weights of the dilactone and diene. In general, however, an amount is used which is ten or more times the amount of dilactone and diene.

The time of reaction depends on the nature of the reactants employed, i. e., dilactone and diene. Usually the reaction is carried out for at least 10 hours. Preferably, however, the reaction is carried out for from 14 to 30 hours.

In the condensation, temperatures are used in the range of 80° to 220° C. However, best results from the standpoint of yield of desired products are realized in the more restricted range of 100° to 200° C. and this embraces the more generally used temperatures.

As illustrated by the working examples, the process by which the products of this invention are obtained can be carried out at atmospheric pressure or at super-atmospheric pressures corresponding to the autogenous pressure of the reactants under the temperature conditions used.

The endo-bridge dilactones of this invention are also useful for the preparation of polymers, as by reaction with polyamines, as described below:

To 0.72 g. of the product of Example III there was added 0.34 g. of hexamethylenediamine and the mixture was heated in a sealed, evacuated tube at 100° C. for 1.5 hours. The product was a pliable resin, which was insoluble in hot acetone and dimethylformamide. This product is useful for coating flexible and rigid substrates, As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An endo-bridge dilactone which consists of the adduct of from one to two moles of a conjugated diene of 4 to 10 carbon atoms and one mole of an unsaturated dilactone represented by one of the structural formulas selected from the class consisting of

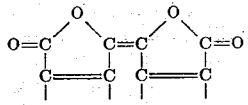

and

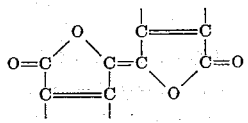

wherein one free valence of each ring is satisfied by R and the other free valence of each ring is satisfied by R', said R and R' being selected from the class consisting of hydrogen, alkoxyaryl where the alkoxy group is of not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, said endobridge dilactone having the doubly bonded carbon atoms of from one to both of the dilactone rings each joined to one mole of said conjugated diene by 1,4-addition.

2. An endo-bridge dilactone which consists of the adduct of from one to two moles of a conjugated diene of 4 to 10 carbon atoms and one mole of the unsaturated dilactone represented by the structural formula

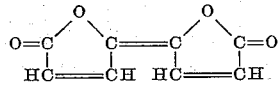

said endo-bridge dilactone having the doubly bonded carbon atoms of from one to both of the dilactone rings each joined to one mole of said conjugated diene by 1,4-addition.

3. An endo-bridge dilactone which consists of the adduct of from one to two moles of a conjugated diene of 4 to 10 carbon atoms and one mole of the unsaturated dilactone represented by the structural formula

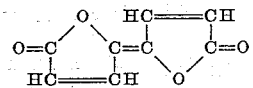

said endo-bridge dilactone having the doubly bonded carbon atoms of from one to both of the dilactone rings each joined to one mole of said conjugated diene by 1,4-addition.

4. An endo-bridge dilactone which consists of the adduct of from one to two moles of a conjugated diene hydrocarbon of 4 to 10 carbon atoms and one mole of the unsaturated dilactone represented by the structural formula

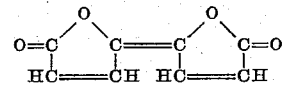

said endo-bridge dilactone having the doubly bonded carbon atoms of from one to both of the dilactone rings each joined to one mole of said conjugated diene hydrocarbon by 1,4-addition.

5. An endo-bridge dilactone which consists of the adduct of from one to two moles of a conjugated diene hydrocarbon of 4 to 10 carbon atoms and one mole of the unsaturated dilactone represented by the structural formula

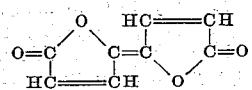

said endo-bridge dilactone having the doubly bonded carbon atoms of from one to both of the dilactone rings each joined to one mole of said conjugated diene hydrocarbon by 1,4-addition.

6. An endo-bridge dilactone which consists of the adduct of one mole of a conjugated diene hydrocarbon of 4 to 10 carbon atoms and one mole of the unsaturated dilactone represented by the structural formula

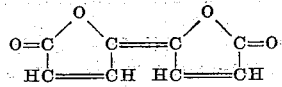

said endo-bridge dilactone having the doubly bonded carbon atoms of solely one of the dilactone rings joined to one mole of said conjugated diene hydrocarbon by 1,4-addition.

7. An endo-bridge dilactone which consists of the adduct of one mole of a conjugated diene hydrocarbon of 4 to 10 carbon atoms and one mole of the unsaturated dilactone represented by the structural formula

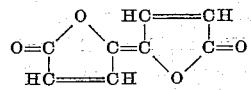

said endo-bridge dilactone having the doubly bonded carbon atoms of solely one of the dilactone rings joined to one mole of said conjugated diene hydrocarbon by 1,4-addition.

8. The endo-bridge dilactone which consists of the 1,4-addition adduct of one mole of 2-methyl-5-isopropyl-1,3-cyclohexadiene and one mole of the unsaturated dilactone represented by the structural formula

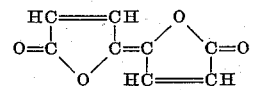

said endo-bridge dilactone being represented by the structural formula

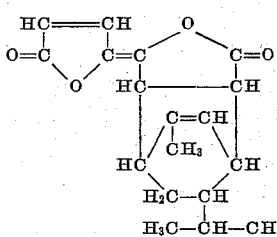

9. Process for preparing an endo-bridge dilactone which comprises heating and reacting at a temperature within the range of 75° to 225° C., from one to two moles of a conjugated diene of 4 to 10 carbon atoms per mole of unsaturated dilactone represented by one of the structural formulas selected from the class consisting of

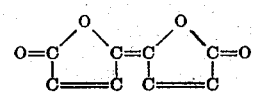

and

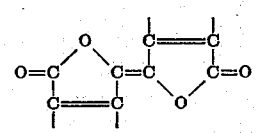

wherein one free valence of each ring is satisfied by R and the other free valence of each ring is satisfied by R', said R and R' being selected from the class consisting of hydrogen, alkoxyaryl where the alkoxy group is of not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, and isolating as the resulting product an endo-bridge dilactone which consists of the 1,4-addition adduct of from one to two moles of said conjugated diene and one mole of said unsaturated dilactone.

10. Process for preparing an endo-bridge dilactone which comprises heating and reacting at a temperature within the range of 75° to 225° C., from one to two moles of a conjugated diene of 4 to 10 carbon atoms per mole of unsaturated dilactone represented by the structural formula

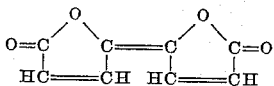

and isolating as the resulting product an endo-bridge dilactone which consists of the 1,4-addition adduct of from one to two moles of said conjugated diene and one mole of said unsaturated dilactone.

11. Process for preparing an endo-bridge dilactone which comprises heating and reacting at a temperature within the range of 75° to 225° C., from one to two moles of a conjugated diene of 4 to 10 carbon atoms per mole of unsaturated dilactone represented by the structural formula

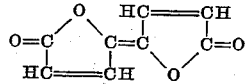

and isolating as the resulting product an endo-bridge dilactone which consists of the 1,4-addition adduct of from one to two moles of said conjugated diene and one mole of said unsaturated dilactone.

12. Process for preparing an endo-bridge dilactone which comprises heating and reacting at a temperature within the range of 75° to 225° C., from one to two moles of a conjugated diene hydrocarbon of 4 to 10 carbon atoms per mole of unsaturated dilactone represented by the structural formula

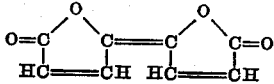

and isolating as the resulting product an endo-bridge dilactone which consists of the 1,4-addition adduct of from one to two moles of said conjugated diene hydrocarbon and one mole of said unsaturated dilactone.

13. Process for preparing an endo-bridge dilactone as set forth in claim 12 which comprises heating and reacting at a temperature of 75° to 225° C. one mole of said conjugated diene hydrocarbon of 4 to 10 carbon atoms per mole of said unsaturated dilactone and isolating as the resulting product an endo-bridge dilactone which consists of the 1,4-addition adduct of one mole of said conjugated diene hydrocarbon and one mole of said unsaturated dilactone.

14. Process for preparing an endo-bridge dilactone which comprises heating and reacting at a temperature within the range of 75° to 225° C. from one to two moles of a conjugated diene hydrocarbon of 4 to 10 carbon atoms per mole of unsaturated dilactone represented by the structural formula

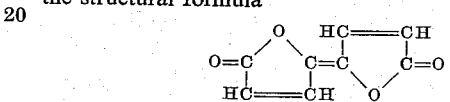

and isolating as the resulting product an endo-bridge dilactone which consists of the 1,4-addition adduct of from one to two moles of said conjugated diene hydrocarbon and one mole of said unsaturated dilactone.

15. Process for preparing an endo-bridge dilactone as set forth in claim 14 which comprises heating and reacting at a temperature of 75° to 225° C. one mole of said conjugated diene hydrocarbon of 4 to 10 carbon atoms per mole of said unsaturated dilactone and isolating as the resulting product an endo-bridge dilactone which consists of the 1,4-addition adduct of one mole of said conjugated diene hydrocarbon and one mole of said unsaturated dilactone.

16. Process for preparing an endo-bridge dilactone which comprises heating and reacting at a temperature within the range of 75° to 225° C. one mole of 2-methyl-5-isopropyl-1,3-cyclohexadiene per mole of unsaturated dilactone represented by the structural formula

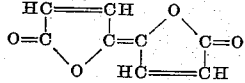

and isolating as the resulting product an endo-bridge dilactone which consists of the 1,4-addition adduct of one mole of 2-methyl-5-isopropyl-1,3-cyclohexadiene and one mole of said unsaturated dilactone.

No references cited.